Jan. 1, 1935.  L. SIMON  1,986,375
SHOCK ABSORBER CONTROL DEVICE
Filed June 5, 1933
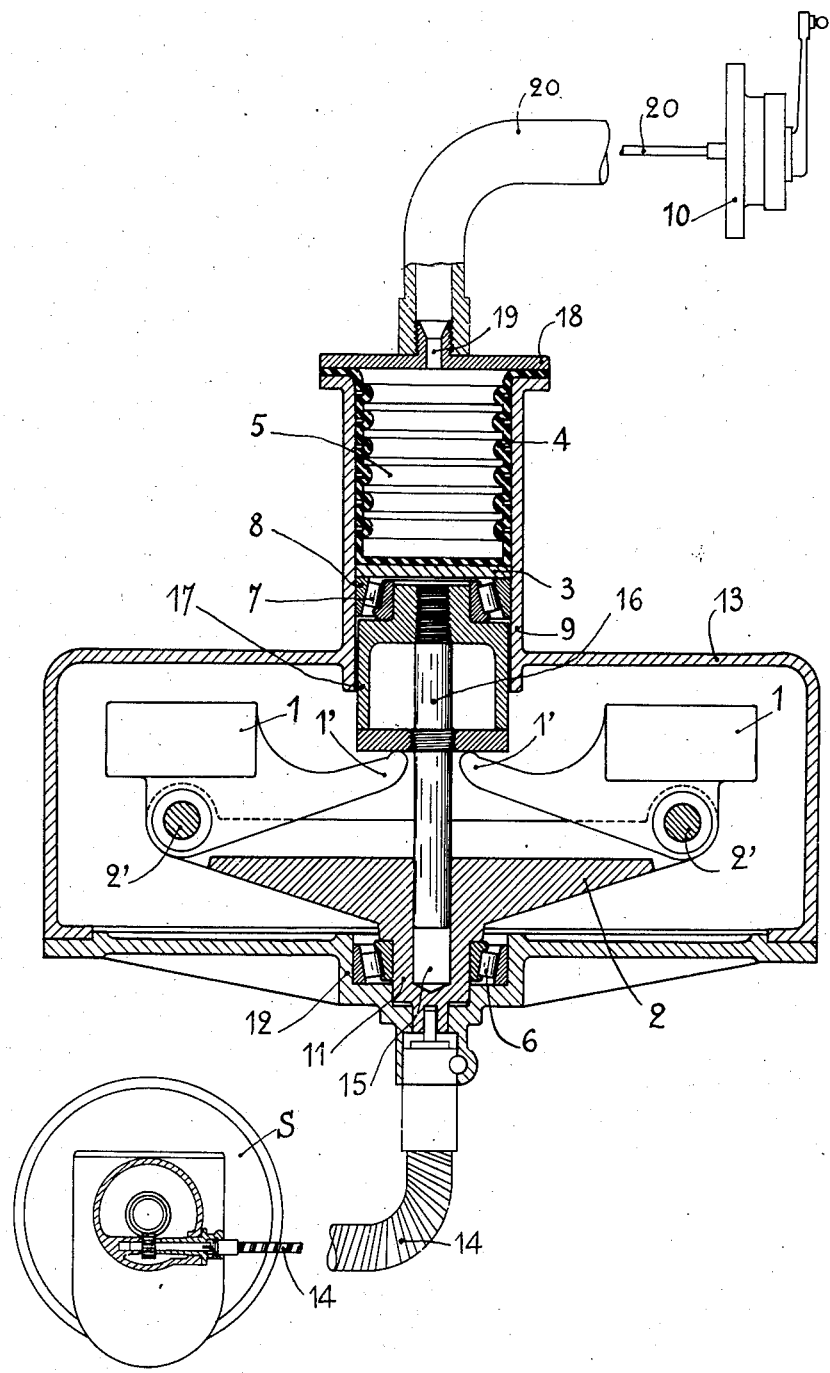
Inventor:
Lucien SIMON
by C.A. Snow & Co.
Attorneys.

UNITED STATES PATENT OFFICE 1,986,375

SHOCK ABSORBER CONTROL DEVICE

Lucien Simon, Paris, France, assignor to Societe d'Exploitation des Brevets Lucien Simon (Amortisseurs Sanchok) Societe Anonyme, Paris, France Application June 5, 1933, Serial No. 674,465
In France June 8, 1932

7 Claims. (Cl. 188—130)

My invention relates to shock absorbing systems for vehicles in which the shock absorbers are of the mechanical friction type, and the friction in said shock absorbers is regulated in accordance with the speed of the vehicle owing to the compressing action exerted by a fluid or liquid acting on a suitable device associated with, or embodied in, the shock absorber.

This compressing action is generally controlled by means of a pump supplying liquid, oil for instance, at a rate varying with the speed of the vehicle.

The object of the present invention is to provide a device for regulating the friction of shock absorbers which avoids any throttling of the stream of oil as it might be produced in release valves and jets such as are used at the present time, and doing away with any discharge in the presence of air.

To this effect, in the device according to my invention, I provide an organ that is rotated with a speed of revolution varying in accordance with the speed of the vehicle. This organ carries masses pivotally mounted thereon and which, under the action of the centrifugal forces, actuate, either directly or indirectly, a wall adapted to move, in a fluidtight manner, in a pressure chamber, for instance, a piston sliding in a cylindrical body made fluidtight by a membrane in contact with said piston. Said chamber or body, the compression chambers of the friction regulating devices of the shock absorbers, and the pipe or pipes that connect said compression chambers with said chamber or body, are filled with a suitable liquid, oil for instance.

This and other characteristics of my invention will appear from the following detailed description of a preferred embodiment of my invention, with reference to the appended drawing given merely by way of example, and in which:

The only figure is an axial sectional view of an embodiment of the control device according to my invention.

The device comprises a circular plate 2 the lower part 11 of which is rotarily mounted, through rollers 6, in a bearing 12 provided in casing 13. This part 11 is connected to the end of a cable 14 driven by an organ actuated by the engine, speedometer S in the present example. A spindle 16 is freely journalled in an axial bore 15 provided in circular plate 2. Said spindle 16 is screwed in a cylindrical piece 17 fitting in a cylindrical body 9 integral with the upper part of casing 13. Cylindrical part 17 carries, at its upper part, the inner cage of a roller bearing 7 the outer cage 8 of which is slidably mounted in cylindrical body 9. A certain number of small masses 1 are pivoted at 2' to the peripheral part of plate 2. Said masses are provided with fingers 1' extending under a kind of shoulder provided on spindle 16 and which consists of the under part of piece 17. A piston 3, slidably mounted in cylindrical body 9, rests merely on the outer cage 8 of roller bearing 7. The upper end of cylindrical body 9 is closed by a plate or cover 18 in such manner that the edges of a deformable membrane 4 are fluidtightly held between the edges of said plate 18 and a flange provided at the upper end of cylindrical body 9. The pleated surface of said membrane is applied against the inner walls of body 9 by the pressure of the liquid therein so as to form a fluidtight chamber the bottom of which rests on piston 3.

A conduit 20 is fitted at one end upon a boss provided with an opening 19 extending throughout cover 18, and is connected at the other end with the compression chamber of the friction regulating device of a shock absorber 10. Chamber 5, pipe 20 and said compression chamber of shock absorber 10 are filled with a suitable liquid, oil for instance.

The operation of the device above described is as follows:

Under the effect of the rotary movement of plate 2, and due to the centrifugal action, which is the stronger as the speed of the vehicle is higher, the fingers 1' of small masses 1 pivot about their axes 2' and act on cylindrical part 17, which transmits this movement to the outer cage 8 of the roller bearing. This cage 8 moves piston 3 upwardly, thus compressing membrane 4 and reducing the volume of chamber 5 so that the liquid contained in said chamber is forced into the compression chamber of the friction regulating device of shock absorber 10.

It will readily be understood that when the speed of the vehicle decreases, a displacement of the parts takes place in the opposite direction, which reduces the pressure in the compression chamber of the friction regulating device of the shock absorber.

It should be noted that the quick rotary movement of plate 2 is transmitted, at a very much reduced rate and through mere friction, to spindle 16, which drives the inner cage of roller bearing 7, the outer cage being braked by its sliding contact with cylindrical body 9 and piston 3, so that the deformable membrane 4 does not undergo any torsional stress.

It is obvious that, if the drawing shows a single shock absorber connected to chamber 5, this is merely for the sake of clearness, as several shock absorbers might be controlled simultaneously by the same device according to my invention.

The volume of said chamber 5 must obviously be greater than the volume of fluid that is to be fed to friction regulating devices of the shock absorbers.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. In a shock absorbing system including at least one mechanical friction shock absorber and friction regulating means, responsive to the pressure of a fluid, for regulating said shock absorber, a device for feeding liquid under the proper pressure to said regulating means which comprises in combination, a chamber of variable volume filled with said liquid and connected with said regulating means, and centrifugal means adapted to rotate at a speed varying in accordance with that of the vehicle for varying the volume of said chamber.

2. In a shock absorbing system including at least one mechanical friction shock absorber and friction regulating means, responsive to the pressure of a fluid, for regulating the friction in said shock absorber, a device for feeding liquid under the proper pressure to said regulating means which comprises in combination, a cylinder filled with liquid and connected with said regulating means, a piston in said cylinder and centrifugal means adapted to rotate at a speed proportional with that of the vehicle for moving said piston in said cylinder.

3. In a shock absorbing system including at least one mechanical friction shock absorber and friction regulating means, responsive to the pressure of a fluid, for regulating the friction in said shock absorber, a device for feeding liquid under the proper pressure to said regulating means which comprises in combination, a cylinder filled with said liquid and connected with said regulating means, a piston in said cylinder, a membrane in said cylinder applied against said piston, and centrifugal means adapted to rotate at a speed proportional with that of the vehicle for moving said piston in said cylinder and thus deforming said membrane.

4. In a shock absorbing system including at least one mechanical friction shock absorber and friction regulating means, responsive to the pressure of a fluid, for regulating the friction in said shock absorber, a device for feeding liquid under the proper pressure to said regulating means which comprises in combination, a cylinder filled with said liquid and connected with said regulating means, a piston in said cylinder, a disc coaxial with said piston and adapted to rotate at a speed proportional with that of the vehicle, a plurality of masses pivoted to said disc about axes substantially at right angles to the axis of revolution of said disc, and means for connecting said masses with said piston so that an outward rotation of said masses causes the piston to move inwardly in its cylinder.

5. In a shock absorbing system including at least one mechanical friction shock absorber and friction regulating means, responsive to the pressure of a fluid, for regulating the friction in said shock absorber, a device for feeding liquid under the proper pressure to said regulating means which comprises in combination, a cylinder filled with said liquid and connected with said regulating means, a piston in said cylinder, a disc coaxial with said piston and adapted to rotate at a speed proportional with that of the vehicle, a rod coaxial with said disc and slidably mounted therein, a thrust bearing the inner element of which is rigidly fixed to said rod and the outer element of which is slidably mounted in said cylinder and applied against said piston, a shoulder carried by said rod, a plurality of masses pivoted to said disc about axes substantially at right angles to the axis of revolution of said disc, and a plurality of radial fingers, integral with said masses respectively and the inner ends of which bear against said shoulder, whereby an outward rotation of said masses causes said piston to be pushed inwardly in said cylinder.

6. A device according to claim 5 further comprising a membrane arranged in said cylinder so as to be applied against the walls thereof, and the face of said piston.

7. In a shock absorbing device including at least one mechanical friction shock absorber and friction regulating means responsive to the pressure of a fluid for regulating the friction in said shock absorber, a device for feeding liquid under the proper pressure to said regulating means, which comprises in combination, a cylinder filled with liquid and connected with said regulating means, a piston in said cylinder, a centrifugal organ adapted to rotate coaxially with said piston and pivoted about an axis at right angles to the axis of said piston, and a member adapted to slide in a direction parallel to the axis of said piston interposed between said centrifugal organ and said piston.

LUCIEN SIMON.